(12) United States Patent
Xiang et al.

(10) Patent No.: US 11,543,072 B2
(45) Date of Patent: Jan. 3, 2023

(54) DISPLAY STAND AND MOUNTING METHOD THEREOF

(71) Applicant: LOCTEK ERGONOMIC TECHNOLOGY CORP., Ningbo (CN)

(72) Inventors: Lehong Xiang, Ningbo (CN); Tao Lin, Ningbo (CN); Tongwang Shao, Ningbo (CN)

(73) Assignee: LOCTEK ERGONOMIC TECHNOLOGY CORP., Ningbo (CN)

( * ) Notice: Subject to any disclaimer, the term of this patent is extended or adjusted under 35 U.S.C. 154(b) by 0 days.

(21) Appl. No.: 16/900,875

(22) Filed: Jun. 13, 2020

(65) Prior Publication Data
US 2021/0018139 A1    Jan. 21, 2021

(30) Foreign Application Priority Data

Jul. 17, 2019    (CN) .......................... 201910645158.7

(51) Int. Cl.
*F16M 11/00* (2006.01)
*F16M 11/12* (2006.01)
*F16M 11/22* (2006.01)

(52) U.S. Cl.
CPC ........... *F16M 11/128* (2013.01); *F16M 11/22* (2013.01); *F16M 11/00* (2013.01); *F16M 2200/02* (2013.01); *F16M 2200/025* (2013.01); *F16M 2200/027* (2013.01)

(58) Field of Classification Search
USPC ... 248/224.8, 224.7, 223.41, 222.11, 222.12, 248/221.11; 361/679.06, 679.07, 679.21, 361/681
See application file for complete search history.

(56) References Cited

U.S. PATENT DOCUMENTS

| | | | | |
|---|---|---|---|---|
| 2,859,840 A * | 11/1958 | Fantle | ..................... | E04H 12/32 52/38 |
| 5,372,346 A * | 12/1994 | Upchurch | ............... | F16B 21/04 248/222.52 |
| 8,540,198 B2 * | 9/2013 | Keyvanloo | ........... | A47F 5/0823 248/222.51 |
| 2011/0113558 A1 * | 5/2011 | Olszewski | .............. | F16B 21/04 5/658 |
| 2018/0094768 A1 * | 4/2018 | Burke | ................ | F16M 11/2014 |

FOREIGN PATENT DOCUMENTS

CN    103953829 B    9/2016

* cited by examiner

*Primary Examiner* — Alfred J Wujciak
(74) *Attorney, Agent, or Firm* — Pearne & Gordon LLP (57) ABSTRACT

The present invention discloses a display stand has a mounting seat connected on a support structure, internally provided with an accommodating cavity and having a slot communicated with the accommodating cavity at the top in an open way, a supporting arm having an insertion end capable of being inserted into the accommodating cavity of the mounting seat from the slot of the mounting seat, and a locking mechanism disposed on the mounting seat or supporting arm, for locking or unlocking the insertion end of the supporting arm in the accommodating cavity. When the insertion end of the supporting arm is locked, the supporting arm is limited within the accommodating cavity of the mounting seat, and when the insertion end of the supporting arm is unlocked, the insertion end of the supporting arm may be taken out from the slot of the mounting seat.

12 Claims, 6 Drawing Sheets

DISPLAY STAND AND MOUNTING METHOD THEREOF

CROSS-REFERENCE TO RELATED APPLICATIONS

This application claims priority to Chinese Patent Application No. 201910645158.7 with a filing date of Jul. 17, 2019. The content of the aforementioned applications, including any intervening amendments thereto, are incorporated herein by reference.

TECHNICAL FIELD

The present invention relates to the technical field of a display bearing device, in particular to a display stand and a mounting method thereof.

BACKGROUND

A display stand is a stand for connection of a computer display whereby a display can be borne, and requirements of consumers on angle and height of the display can be met. The display stand has been widely used in daily life of people, including work and study, and is very popular with people. The display stand generally has two types: a desktop display stand and a floor display stand in accordance with its mounting way. The desktop display stand in the prior art is often connected to a desktop or table top, and structurally comprises a supporting arm, an adjusting arm, a display mounting frame and a grip slipper, the lower end of the supporting arm is rotatably connected with the grip slipper, the upper end of the supporting arm is rotatably connected with the adjusting arm, the adjusting arm is connected with the display mounting frame, and the adjusting arm is used for angle adjustment in left-right and upper-lower directions. The grip slipper of the display stand in the prior art is gripped on the desktop, taking the application for a patent with the authorized publication No. CN103953829B entitled "FLAT-PANEL DISPLAY STAND" in the website of the CNIPA as an example. In the above application, the grip slipper comprises a support plate connected to the bottom of a base, an adjusting screw rod is in threaded connection on the support plate, the lower end of the adjusting screw rod is connected with a rotary knob, the upper end of the adjusting screw rod is fixedly connected with a washer, a space for gripping on the desktop is reserved between the washer and the base, and the support body can be fixedly connected to the desktop through the adjusting screw rod. Or the grip slipper used comprises bolts capable of passing through threading holes on the desktop, and the display stand is fixedly connected on the desktop through the bolts. In the prior art, connecting the display stand on the desktop either by a grip slipper or by connection bolts causes inconvenience in mounting, in particular, a qualified mounting person or experienced man is needed in the mounting process as it is very troublesome and labored, and in contrast, mounting is disenabled by women with less strength. Further, in disassembly, it is also labored to unscrew the adjusting screw rod or connection bolts, thus operation is inconvenient.

SUMMARY

The technical problem to be resolved by the present disclosure is to provide a display stand convenient and labor-saving in connection with a support structure, and simple and easy in disassembly.

The technical solution adopted by the present disclosure provides a display stand, comprising: a mounting seat connected on a support structure, internally provided with an accommodating cavity and having a slot communicated with the accommodating cavity at the top in an open way, a supporting arm having an insertion end capable of being inserted into the accommodating cavity of the mounting seat from the slot of the mounting seat, and a locking mechanism disposed on the mounting seat or supporting arm, for locking or unlocking the insertion end of the supporting arm in the accommodating cavity. When the insertion end of the supporting arm is locked, the supporting arm is limited within the accommodating cavity of the mounting seat, and when the insertion end of the supporting arm is unlocked, the insertion end of the supporting arm may be taken out from the slot of the mounting seat.

In some embodiment, the locking mechanism refers to such a structure that the outer side wall of the insertion end of the supporting arm is provided with an opening in which a locking tab is movably connected. The locking mechanism further comprises a button, and elastic components for applying elastic forces to the locking tab. In the normal state, the free end of the locking tab extends out of the opening, and the button and the locking log are connected for controlling the locking tab to overcome the elastic forces of the elastic components so that the free end of the locking tab retracts back to the opening. The inner wall of the accommodating cavity is provided with a locking hole for insertion of the free end of the locking tab. When the insertion end of the supporting arm is inserted into the accommodating cavity of the mounting seat, the free end of the locking tab is inserted into the locking hole on the inner wall of the accommodating cavity under the effect of elastic forces of the elastic components so that the insertion end of the supporting arm is locked.

In some embodiment, the locking mechanism refers to such a structure that the inner side wall of the accommodating cavity of the mounting seat is provided with an opening in which a locking tab is movably connected. The locking mechanism further comprises a button, and elastic components for applying elastic forces to the locking tab. In the normal state, the free end of the locking tab extends out of the opening, and the button and the locking log are connected for controlling the locking tab to overcome the elastic forces of the elastic components so that the free end of the locking tab retracts back to the opening. The outer side wall of the insertion end of the supporting arm is provided with a locking hole for insertion of the free end of the locking tab. When the insertion end of the supporting arm is inserted into the accommodating cavity of the mounting seat, the free end of the locking tab is inserted into the locking hole in the supporting arm under the effect of elastic forces of the elastic components so that the insertion end of the supporting arm is locked.

In some embodiment, a locating pin is connected inside the accommodating cavity. At the bottom of the insertion end of the supporting arm, a locating slot matching the locating pin for insertion is provided. When the insertion end of the supporting arm is inserted into the accommodating cavity and the locating slot at the bottom of the insertion end is inserted on the locating pin, the free end of the locking tab is inserted into the locking hole under the effect of elastic forces of the elastic components.

In some embodiment, a base is connected in an inner bore of the supporting arm. A movable part is movably connected on the base. The locking tab and the button are respectively connected to the same outer side wall of the movable part. Guide holes consistent with the locking tab in moving direction are formed on the base. One side wall of the movable part proximal the base is provided with guide poles. The guide poles are positioned within the guide holes by sliding fit. The elastic component sleeves the guide pole, one end of the elastic component abuts the movable part, and the other end of the elastic component abuts the inner bottom wall of the guide hole. The supporting arm is provided with a button hole. Under the effect of the elastic forces of the elastic components, the button and the locking tab respectively penetrate through the button hole and the opening and are disposed outside the supporting arm by means of the movable part.

In some embodiment, on the outer side wall of the base, an elastic fastener is provided. The inner wall of the supporting arm has a clamping hole matching the elastic fastener for clamping. The elastic fastener and the clamping hole are elastically clamped.

In some embodiment, the button is located above the locking tab. When the insertion end of the supporting arm is inserted into the accommodating cavity, that is, at a locked state, the button is located above the support structure.

In some embodiment, the mounting seat comprises a connecting plate at the bottom of a reserved hole of the support structure and a cylinder connected to the bottom of the connecting plate. The cylinder is internally provided with an accommodating cavity. The slot is formed on the connecting plate and communicated with the reserved hole of the support structure.

In some embodiment, the display stand also comprises a connecting block connected on the supporting arm. The connecting block is rotatably connected with a rotating arm component. The rotating arm component is connected with a display support board for mounting of a display.

As an improvement, a housing slidably sleeves the supporting arm for shielding the button on the supporting arm. Due to the housing, the button on the supporting arm is shielded so as to prevent the button from being pressed by mistake. Shielding the button endows the supporting arm with a smooth surface and high aesthetic degree.

Compared with the prior art, the display stand disclosed by the present invention with the above-mentioned structure has the following advantages:

1) the supporting arm of the display stand and the support structure are connected through the mounting seat that is disposed on the support structure, and meanwhile, the mounting seat is internally provided with the accommodating cavity, so that when the insertion end of the supporting arm is inserted into the accommodating cavity through the slot, the insertion end of the supporting arm is locked in the accommodating cavity through the locking mechanism. The supporting arm of the display stand and the support structure are very labor-saving to connect and convenient to operate. In case of disassembling the display stand, provided the insertion end of the supporting arm inserted into the accommodating cavity is unlocked by the locking mechanism, the insertion end of the supporting arm can be taken out from the slot of the mounting seat. Therefore, connection of the display stand and the support structure becomes convenient and labor-saving, and disassembly is simple and easy. In particular, even a woman with less strength can connect the display stand on the support structure conveniently and rapidly.

2) the locking mechanism can be disposed on either the supporting arm or the mounting seat, depending on user's requirements. When the locking mechanism is disposed on the supporting arm, if the insertion end of the supporting arm is inserted into the accommodating cavity, the locking tab on the side wall of the insertion end of the supporting arm overcomes the elastic forces of the elastic components to retract back to the opening under extrusion of the inner wall of the accommodating cavity. When the locking tab is aligned to the locking hole in the accommodating cavity, the locking tab extends out of the opening and is inserted into the locking hole by means of elastic forces of the elastic components, by this time, the insertion end of the supporting arm is locked. When the display stand needs to be taken down, the button is pressed by a hand, the button drives the locking tab to advance into the opening after overcoming the elastic forces of the elastic components so as to disengage the free end of the locking tab from the locking hole, by this time, the insertion end of the supporting arm is unlocked, facilitating taking down the display stand from the support structure. In other words, the work principle is same when the locking mechanism is disposed on the mounting seat. As a result, the locking mechanism is simple in structure, and convenient and labor-saving in operation.

3) the locating pin in the accommodating cavity and the locating slot on the bottom of the supporting arm are in inserted match so as to play a limiting role for insertion depth of the insertion end of the supporting arm and a positioning role for the insertion end of the supporting arm, thereby bringing convenience to inserted match of the locking tab and the locking hole. Owing to the inserted match of the locating pin and the locating slot and the inserted match of the locking tab and the locking hole, the supporting arm is prevented from rotating in the mounting seat, thereby facilitating angle adjustment of the display on the supporting arm. Therefore, it is rapid to connect and mount the display stand with the support structure and good in user experience.

4) the base of the locking mechanism and the inner bore of the supporting arm are limited and connected by means of elastic clamping of the elastic fastener on the base and the clamping hole of the inner bore of the supporting arm, and inserted match of the button and the locking tab, and the button hole and the opening, therefore, mounting is simple and connection structure is stable and firm.

The present invention also discloses a mounting method of the display stand, comprising the following steps:

1) connecting the mounting seat of claim 1 on the support structure; 2) inserting the insertion end of the supporting arm of the display stand of claim 1 into the accommodating cavity through the slot of the mounting seat; 3) adjusting the position of the insertion end of the supporting arm within the accommodating cavity to enable the locking tab on the insertion end to be inserted into the locking hole on the inner wall of the accommodating cavity; and 4) sliding the housing on the supporting arm toward the mounting seat and shielding the button on the supporting arm.

In some embodiment, a locating pin is connected inside the accommodating cavity. A locating slot matching the locating pin for insertion is formed at the bottom of the insertion end of the supporting arm. When the insertion end of the supporting arm is inserted in the accommodating cavity and the locating slot at the bottom of the insertion end is inserted on the locating pin, the free end of the locking tab is inserted into the locking hole on the inner wall of the accommodating cavity.

By adopting the above mounting method of the display stand, the present invention has the following advantages as compared to the prior art:

1. the display stand is simple and convenient to mount, to be specific, the mounting seat is first connected on the support structure selected from one of a group of a workbench, a worktable, a desktop lifting platform, a wall, a screen, etc.; the insertion end of the supporting arm of the display stand is inserted into the accommodating cavity of the mounting seat and subjected to position adjustment to enable the locking tab on the insertion end to be inserted into the locking hole of the accommodating cavity; and then covering the housing, i.e., the display stand is well mounted. Apparently, mounting is simple, convenient and labor-saving.

2. the locating pin in the accommodating cavity and the locating slot on the bottom of the supporting arm are in inserted match so as to play a limiting role for insertion depth of the insertion end of the supporting arm and a positioning role for the insertion end of the supporting arm, thereby bringing convenience to inserted match for the locking tab and the locking hole. Owing to the inserted match of the locating pin and the locating slot and the inserted match of the locking tab and the locking hole, the supporting arm is prevented from rotating in the mounting seat, thereby facilitating angle adjustment of the display on the supporting arm. Therefore, by means of the mounting method of the display stand, the display stand is rapid to connect and mount, and user experience is good.

The reference numerals represent: 1 support structure; 100 reserved hole; 2 mounting seat; 200 accommodating cavity; 201 slot; 202 connecting plate; 203 cylinder; 204 locking hole; 205 screw hole; 206 locating pin; 3 supporting arm; 300 insertion end; 301 locating slot; 302 opening; 303 button hole; 304 clamping hole; 305 connection block; 306 rotating arm component; 307 display support board; 308 housing; 4 locking mechanism; 400 base; 401 movable part; 402 locking tab; 403 button; 404 guide pole; 405 guide hole; 406 elastic component; 407 elastic fastener; 408 accommodating groove.

EMBODIMENTS

The present invention will be further explained in detail in the following embodiments with reference to the accompanying drawings.

As shown in FIGS. 1-6, the present invention discloses a display stand, comprising: a mounting seat 2 connected on a support structure 1, internally provided with an accommodating cavity 200 and having a slot 201 communicated with the accommodating cavity 200 at the top in an open way, and a supporting arm 3 having an insertion end 300 capable of being inserted into the accommodating cavity 200 of the mounting seat 2 from the slot 201 of the mounting seat 2. A connection block 305 is connected on the supporting arm 3. A rotating arm component 306 is rotatably connected on the connection block 305. The rotating arm component 306 is connected with a display support board 307 for mounting of a display and comprises at least two rotating arms. The display support board 307 is rotatably connected to the rotating arm at the outermost side. A locking mechanism 4 is disposed on the mounting seat 2 or supporting arm 3, for locking or unlocking the insertion end 300 of the supporting arm 3 in the accommodating cavity 200. When the insertion end 300 of the supporting arm 3 is locked, the supporting arm 3 is limited within the accommodating cavity 200 of the mounting seat 2, and when the insertion end 300 of the supporting arm 3 is unlocked, the insertion end 300 of the supporting arm 3 may be taken out from the slot 201 of the mounting seat 2. The support structure may be selected from one of a group of a workbench, a worktable, a desktop lifting platform, a wall, a screen, etc. This embodiment is described by exemplifying a workbench as the support structure. The supporting arm of the display stand and the support structure are connected through the mounting seat that is disposed on the support structure, and meanwhile, the mounting seat is internally provided with the accommodating cavity, so that when the insertion end of the supporting arm is inserted into the accommodating cavity through the slot, the insertion end of the supporting arm is locked within the accommodating cavity through the locking mechanism. The supporting arm of the display stand and the support structure are very labor-saving to connect and convenient to operate. In case of disassembling the display stand, provided the insertion end of the supporting arm inserted into the accommodating cavity is unlocked by the locking mechanism, the insertion end of the supporting arm can be taken out from the slot of the mounting seat. Therefore, connection of the display stand and the support structure becomes convenient and labor-saving, disassembly is simple and easy. In particular, even a woman with less strength can connect the display stand on the support structure conveniently and rapidly.

Figure 1:
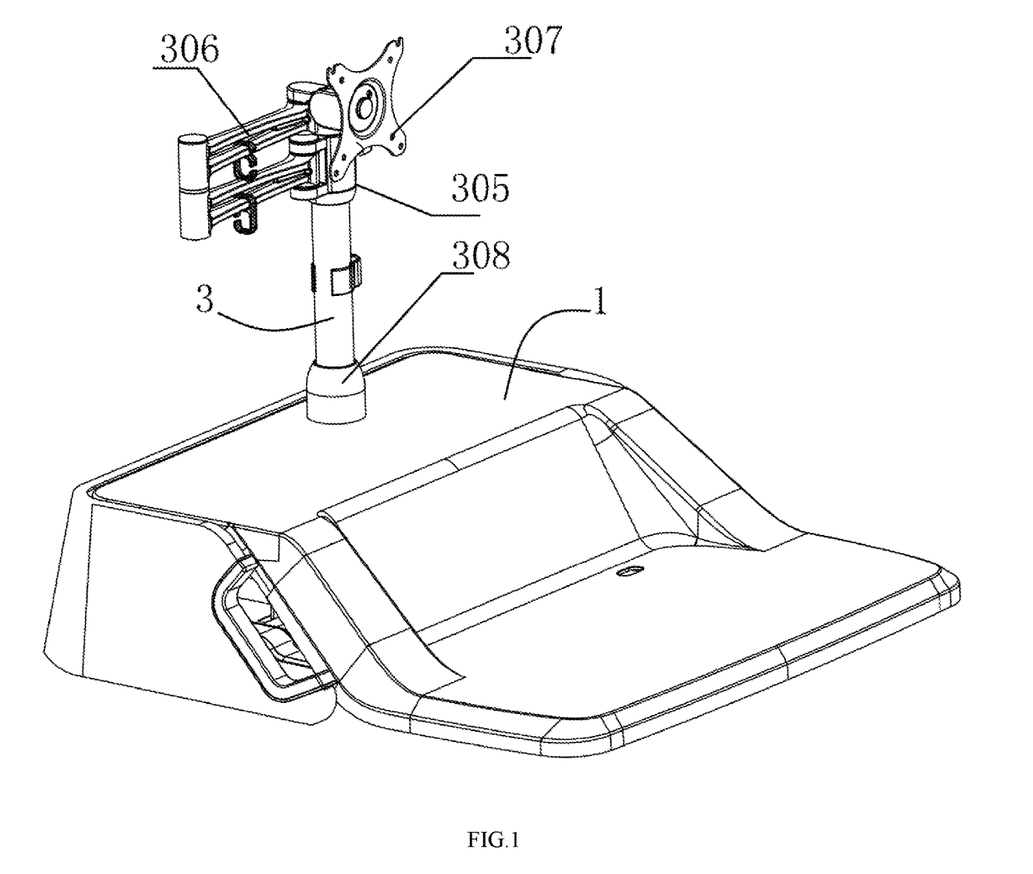
FIG. 1 is a schematically structural diagram of a display stand of the present invention.
Figure 2:
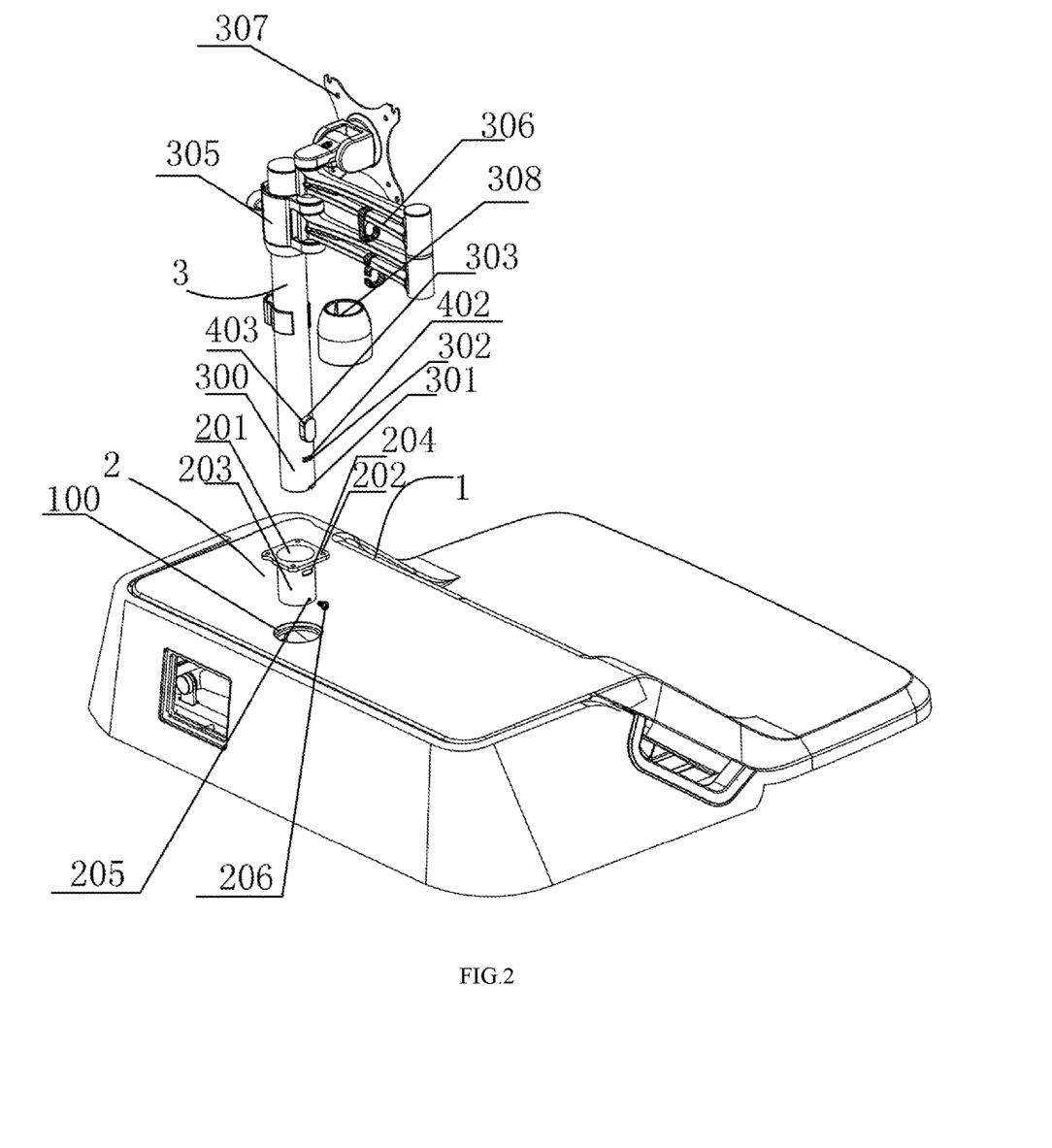
FIG. 2 is a schematic diagram of an assembly structure of the display stand and a workbench of the present invention.
Figure 3:
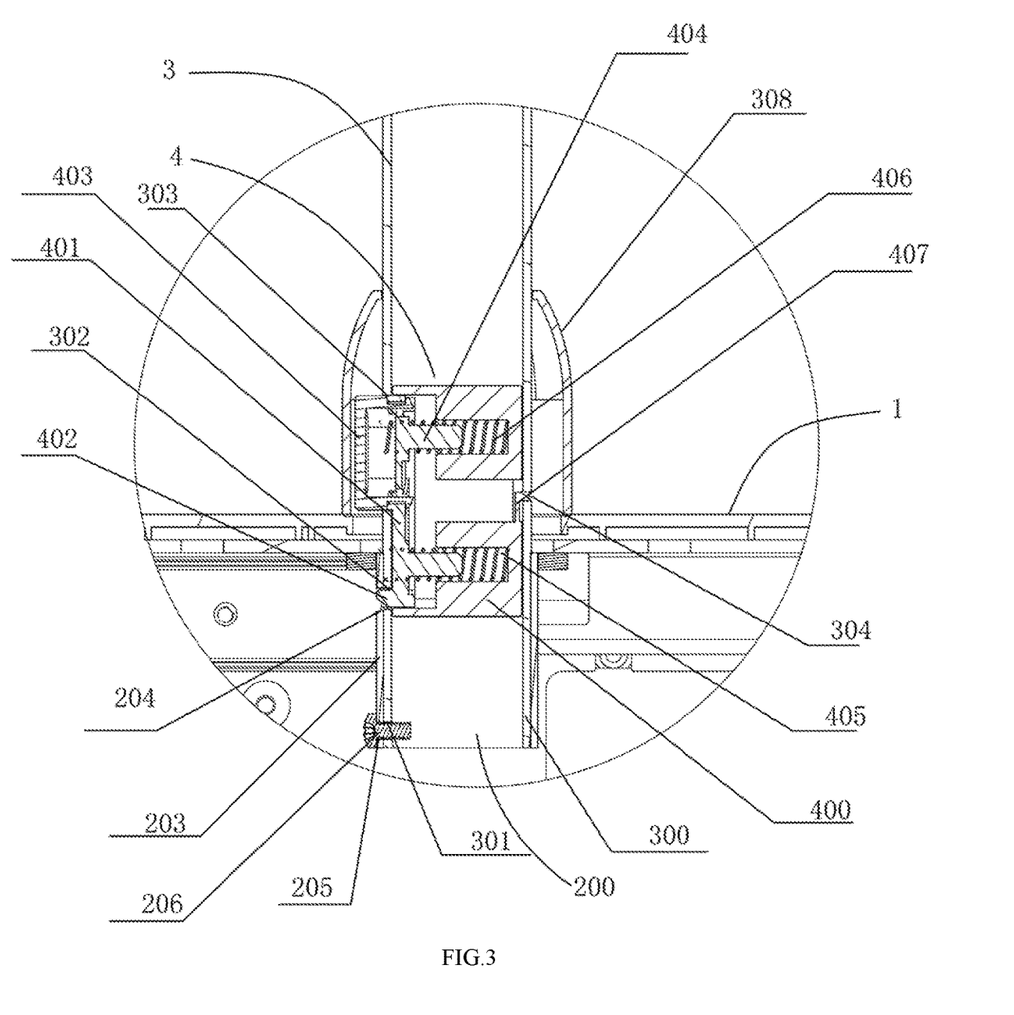
FIG. 3 is a partial section view of the display stand of the present invention.

Further referring to FIGS. 2-3, if disposed in the supporting arm, the locking mechanism 4 refers to such a structure that the outer side wall of the insertion end 300 of the supporting arm 3 is provided with an opening 302 in which a locking tab 402 is movably connected. The locking mechanism further comprises a button 403, and elastic components 406 for applying elastic forces to the locking tab 402. In the normal state, the free end of the locking tab 402 extends out of the opening 302, and the button 403 and the locking log 402 are connected for controlling the locking tab 402 to overcome the elastic forces of the elastic components 406 so that the free end of the locking tab 402 retracts back to the opening 302. The inner wall of the accommodating cavity 200 is provided with a locking hole 204 for insertion of the free end of the locking tab 402. When the insertion end 300 of the supporting arm 3 is inserted into the accommodating cavity 200 of the mounting seat 2, the free end of the locking tab 402 is inserted into the locking hole 204 on the inner wall of the accommodating cavity 200 under the effect of elastic forces of the elastic components 406 so that the insertion end 300 of the supporting arm 3 is locked. When the insertion end of the supporting arm is inserted into the accommodating cavity, the locking tab on the side wall of the insertion end of the supporting arm overcomes the elastic forces of the elastic components to retract back to the opening under extrusion of the inner wall of the accommodating cavity. When the locking tab is aligned to the locking hole in the accommodating cavity, the locking tab extends out of the opening and is inserted into the locking hole by means of elastic forces of the elastic components, by this time, the insertion end of the supporting arm is locked. When the display stand needs to be taken down, the button is pressed by a hand, the button drives the locking tab to advance into the opening after overcoming the elastic forces of the elastic components so as to disengage the free end of the locking tab from the locking hole, by this time, the insertion end of the supporting arm is unlocked, facilitating taking down the display stand from the support structure. In other words, the work principle is same when the locking mechanism is disposed on the mounting seat. As a result, the locking mechanism is simple in structure, and convenient and labor-saving in operation.

If disposed on the mounting seat, the locking mechanism refers to such a structure that the inner side wall of the accommodating cavity of the mounting seat is provided with an opening in which a locking tab is movably connected. The locking mechanism further comprises a button, and elastic components for applying elastic forces to the locking tab. In the normal state, the free end of the locking tab extends out of the opening, and the button and the locking log are connected for controlling the locking tab to overcome the elastic forces of the elastic components so that the free end of the locking tab retracts back to the opening. The outer side wall of the insertion end of the supporting arm is provided with a locking hole for insertion of the free end of the locking tab. When the insertion end of the supporting arm is inserted into the accommodating cavity of the mounting seat, the free end of the locking tab is inserted into the locking hole on the supporting arm under the effect of elastic forces of the elastic components so that the insertion end of the supporting arm is locked. Of course, the locking mechanism may have other forms, for example, the mounting seat and the insertion end of the supporting arm are inserted and locked with a movable bolt, and the movable bolt is directly removed in case of taking down the supporting arm. For another example, an automatic clamping structure also can be disposed in the accommodating cavity, and an annular groove is formed on the outer circumferential wall of the insertion end of the supporting arm, therefore, when the insertion end of the supporting arm is inserted into the accommodating cavity, the automatic clamping structure is clamped in the annular groove of the insertion end, and is opened in case of unlocking, so that the insertion end can be taken out from the accommodating cavity. The automatic clamping structure may be comprised by two hinged clamp plates and thus are at a clamped state due to connection with springs. The insertion end of the supporting arm can be inserted when the two clamp plates are opened after elastic forces of the springs are overcome. The above technical solutions all fall into the protection scope of the present invention.

Figure 4:
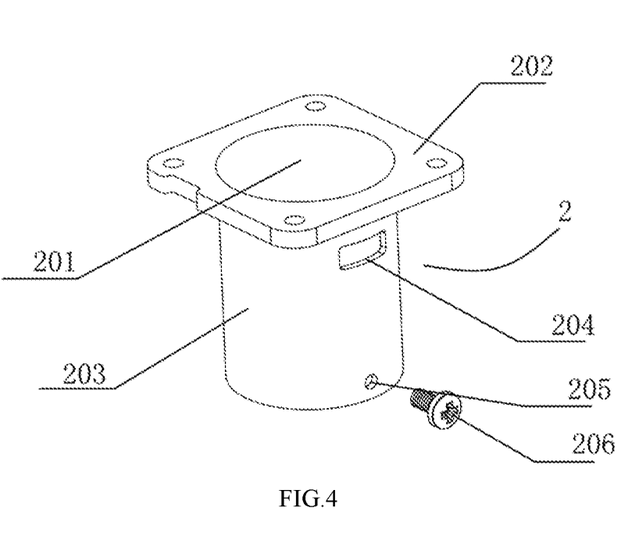
FIG. 4 is a schematically structural diagram of a mounting seat of the display stand of the present invention.

Referring to FIGS. 3-4, a locating pin 206 is connected inside the accommodating cavity 200. At the bottom of the insertion end 300 of the supporting arm 3, a locating slot 301 matching the locating pin 206 for insertion is provided. When the insertion end 300 of the supporting arm 3 is inserted into the accommodating cavity 200 and the locating slot 301 at the bottom of the insertion end 300 is inserted on the locating pin 206, the free end of the locking tab 402 is inserted into the locking hole 204 under the effect of elastic forces of the elastic components 406. The insertion end 300 of the supporting arm 3 is provided with a screw hole 205. The locating pin 206 is spirally connected in the screw hole 205, and the free end of the locating pin 206 extends in the accommodating cavity 200 to limit the insertion end 300 of the supporting arm 3. The locating pin in the accommodating cavity and the locating slot on the bottom of the supporting arm are in inserted match so as to play a limiting role for insertion depth of the insertion end of the supporting arm and a positioning role for the insertion end of the supporting arm, thereby bringing convenience to inserted match of the locking tab and the locking hole. Owing to the inserted match of the locating pin and the locating slot and the inserted match of the locking tab and the locking hole, the supporting arm is prevented from rotating in the mounting seat, thereby facilitating angle adjustment of the display on the supporting arm. Therefore, it is rapid to connect and mount the display stand with the support structure and good in user experience.

Figure 5:
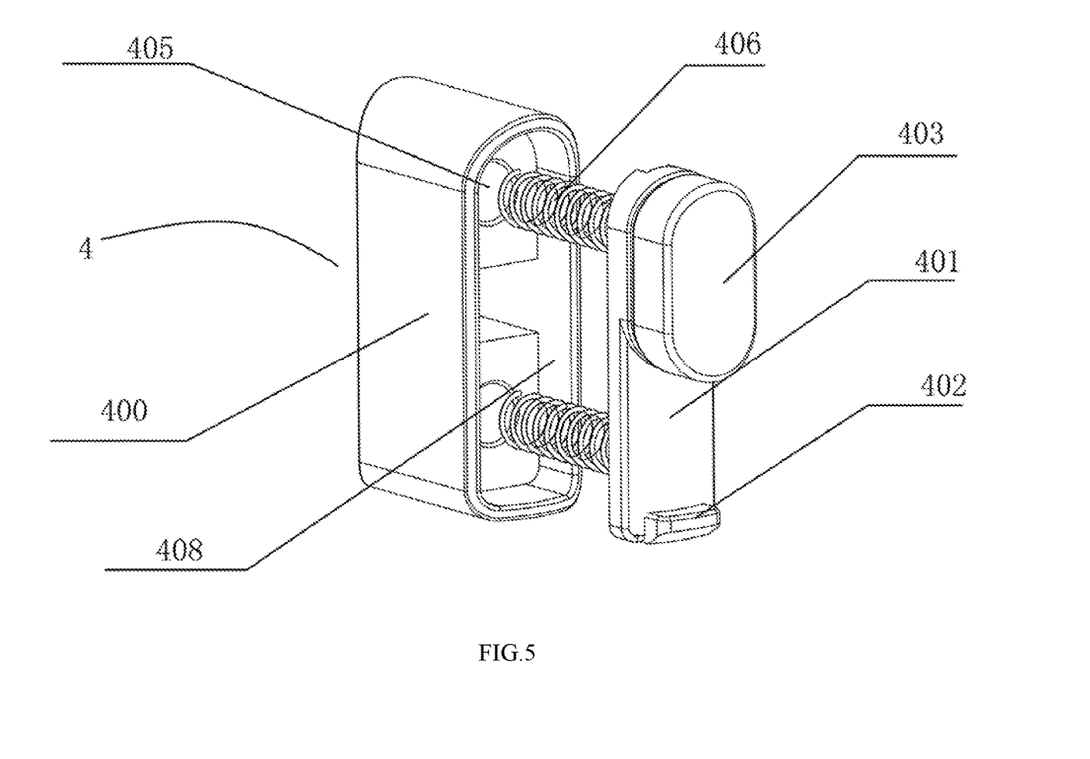
FIG. 5 is a schematic diagram of an assembly structure of a locking mechanism of the display stand of the present invention.
Figure 6:
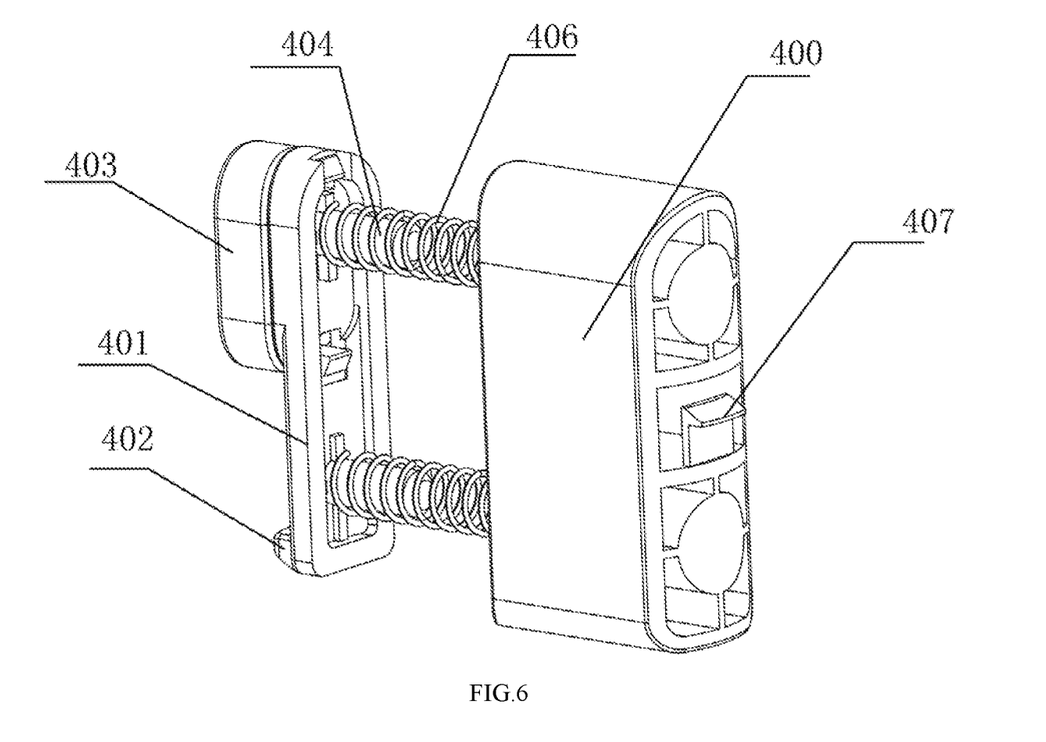
FIG. 6 is a schematic diagram of an assembly structure of the locking mechanism of the display stand of the present invention, viewed from another angle.

As shown in FIGS. 5-6, a base 400 is connected in an inner bore of the supporting arm 3. A movable part 401 is movably connected on the base 400. An accommodating groove 408 is formed on the base 400. The movable part 401 is in clearance fit inside the accommodating groove 408. The movable part 401 has a movable spacing in the accommodating groove 408. The locking tab 402 and the button 403 are respectively connected to the same outer side wall of the movable part 401. Guide holes 405 consistent with the locking tab 402 in moving direction are formed on the base 400. One side wall of the movable part 401 proximal the base 400 is provided with guide poles 404. The guide poles 404 are positioned in the guide holes 405 by sliding fit. The elastic component 406 sleeves the guide pole 404, one end of the elastic component 406 abuts the movable part 401, and the other end of the elastic component 406 abuts the inner bottom wall of the guide hole 405. The supporting arm 3 is provided with a button hole 303. Under the effect of the elastic forces of the elastic components 406, the button 403 and the locking tab 402 respectively penetrate through the button hole 303 and the opening 302 and are disposed outside the supporting arm by means of the movable part 401. On the outer side wall of the base 400, an elastic fastener 407 is provided. The inner wall of the supporting arm 3 has a clamping hole 304 matching the elastic fastener 407 for clamping. The elastic fastener and the clamping hole are elastically clamped. The base of the locking mechanism and the inner bore of the supporting arm are limited and connected by means of elastic clamping of the elastic fastener on the base and the clamping hole of the inner bore of the supporting arm, and inserted match of the button and the locking tab, and the button hole and the opening, therefore, mounting is simple and connection structure is stable and firm.

Further referring to FIGS. 2-3, the button 403 is located above the locking tab 402. When the insertion end 300 of the supporting arm 3 is inserted into the accommodating cavity 200, that is, at a locked state, the button 403 is located above the support structure 1. In such a case, it is simple and convenient to unlock the locking mechanism.

Further referring to FIGS. 2 and 4, if the support structure is a workbench or desk plate, the mounting seat 2 comprises a connecting plate 202 at the bottom of a reserved hole 100 of the support structure 1 and a cylinder 203 connected to the bottom of the connecting plate 202. The cylinder 203 is internally provided with an accommodating cavity 200. The slot 201 is formed on the connecting plate 202 and communicated with the reserved hole 100 of the support structure 1.

Referring back to FIG. 1, a housing 308 slidably sleeves the supporting arm 3 for shielding the button 403 on the supporting arm 3. Due to the housing, the button on the supporting arm is shielded so as to prevent the button from being pressed by mistake. Shielding the button endows the supporting arm with a smooth surface and high aesthetic degree.

The present invention also discloses a mounting method of the display stand, comprising the following steps:

1) connecting the above mounting seat on the support structure; 2) inserting the insertion end of the supporting arm of the display stand into the accommodating cavity through the slot of the mounting seat; 3) adjusting the position of the insertion end of the supporting arm within the accommodating cavity to enable the locking tab on the insertion end to be inserted in the locking hole on the inner wall of the accommodating cavity; and 4) sliding the housing on the supporting arm toward the mounting seat and shielding the button on the supporting arm. By adopting the above mounting method, the display stand is simple and convenient to mount, to be specific, the mounting seat is first connected on the support structure selected from one of a group of a workbench, a worktable, a desktop lifting platform, a wall, a screen, etc.; the insertion end of the supporting arm of the display stand is inserted into the accommodating cavity of the mounting seat and subjected to position adjustment to enable the locking tab on the insertion end to be inserted into the locking hole of the accommodating cavity; and then the housing is covered, i.e., the display stand is well mounted. Apparently, mounting is simple, convenient and labor-saving.

The locating pin is connected inside the accommodating cavity. At the bottom of the insertion end of the supporting arm, the locating slot matching the locating pin for insertion is provided. When the insertion end of the supporting arm is inserted into the accommodating cavity and the locating slot on the bottom of the insertion end is inserted on the locating pin, the free end of the locking tab is inserted into the locking hole on the inner wall of the accommodating cavity under the effect of elastic forces of the elastic components. The locating pin in the accommodating cavity and the locating slot on the bottom of the supporting arm are in inserted match so as to play a limiting role for insertion depth of the insertion end of the supporting arm and a positioning role for the insertion end of the supporting arm, thereby bringing convenience to inserted match of the locking tab and the locking hole. Owing to the inserted match of the locating pin and the locating slot and the inserted match of the locking tab and the locking hole, the supporting arm is prevented from rotating in the mounting seat, thereby facilitating angle adjustment of the display on the supporting arm. Therefore, it is rapid to connect and mount the display stand with the support structure and good in user experience.

The described above is merely the embodiments of the present invention, but its protection scope is never limited thereto. Meanwhile, any variations or substitutions which easily occur to a skilled person in the art and are contained in the disclosure of the present invention, shall be covered by the protection scope of the present invention. Therefore, the claims should prevail over the protection scope of the present invention.

We claim:

1. A display stand, wherein it comprises:
    a mounting seat connected on a support structure, internally provided with an accommodating cavity and having a slot communicated with the accommodating cavity at the top in an open way;
    a supporting arm having an insertion end capable of being inserted into the accommodating cavity of the mounting seat from the slot of the mounting seat;
    a connecting block connected on the supporting arm; the connecting block is rotatably connected with a rotating arm component and the rotating arm component is connected with a display support board for mounting of a display; and
    a locking mechanism disposed on the mounting seat or supporting arm, for locking or unlocking the insertion end of the supporting arm in the accommodating cavity; when the insertion end of the supporting arm is locked, the supporting arm is limited within the accommodating cavity of the mounting seat, and when the insertion end of the supporting arm is unlocked, the insertion end of the supporting arm may be taken out from the slot of the mounting seat, wherein the locking mechanism is a structure that the outer side wall of the insertion end of the supporting arm is provided with an opening in which a locking tab is movably connected; the locking mechanism further comprises a button, and elastic components for applying elastic forces to the locking tab; in the normal state, the free end of the locking tab extends out of the opening, and the button and the locking log are connected for controlling the locking tab to overcome the elastic forces of the elastic components so that the free end of the locking tab retracts back to the opening; the inner wall of the accommodating cavity is provided with a locking hole for insertion of the free end of the locking tab; when the insertion end of the supporting arm is inserted into the accommodating cavity of the mounting seat, the free end of the locking tab is inserted into the locking hole on the inner wall of the accommodating cavity under the effect of elastic forces of the elastic components so that the insertion end of the supporting arm is locked.

2. The display stand of claim 1, wherein the locking mechanism is a structure that the inner side wall of the accommodating cavity of the mounting seat is provided with an opening in which a locking tab is movably connected; the locking mechanism further comprises a button, and elastic components for applying elastic forces to the locking tab; in the normal state, the free end of the locking tab extends out of the opening, and the button and the locking log are connected for controlling the locking tab to overcome the elastic forces of the elastic components so that the free end of the locking tab retracts back to the opening; the outer side wall of the insertion end of the supporting arm is provided with a locking hole for insertion of the free end of the locking tab; when the insertion end of the supporting arm is inserted into the accommodating cavity of the mounting seat, the free end of the locking tab is inserted into the locking hole in the supporting arm under the effect of elastic forces of the elastic components so that the insertion end of the supporting arm is locked.

3. The display stand of claim 2, wherein a locating pin is connected inside the accommodating cavity; at the bottom of the insertion end of the supporting arm, a locating slot matching the locating pin for insertion is provided; when the insertion end of the supporting arm is inserted into the accommodating cavity and the locating slot at the bottom of the insertion end is inserted on the locating pin, the free end of the locking tab is inserted into the locking hole under the effect of elastic forces of the elastic components.

4. The display stand of claim 2, wherein a housing slidably sleeves the supporting arm, and the housing is used for shielding the button on the supporting arm.

5. The display stand of claim 1, wherein a locating pin is connected inside the accommodating cavity; at the bottom of the insertion end of the supporting arm, a locating slot matching the locating pin for insertion is provided; when the insertion end of the supporting arm is inserted into the accommodating cavity and the locating slot at the bottom of the insertion end is inserted on the locating pin, the free end of the locking tab is inserted into the locking hole under the effect of elastic forces of the elastic components.

6. The display stand of claim 1, wherein a base is connected in an inner bore of the supporting arm; a movable part is movably connected on the base; the locking tab and the button are respectively connected to the same outer side wall of the movable part; guide holes consistent with the locking tab in moving direction are formed on the base; one side wall of the movable part proximal the base is provided with guide poles; the guide poles are positioned within the guide holes by sliding fit; the elastic component sleeves the guide pole, one end of the elastic component abuts the movable part, and the other end of the elastic component abuts the inner bottom wall of the guide hole; the supporting arm is provided with a button hole; under the effect of the elastic forces of the elastic components, the button and the locking tab respectively penetrate through the button hole and the opening and are disposed outside the supporting arm by means of the movable part.

7. The display stand of claim 6, wherein the outer side wall of the base is provided with an elastic fastener; the inner wall of the supporting arm is provided with a clamping hole matching the elastic fastener for clamping and the elastic fastener and the clamping hole are elastically clamped.

8. The display stand of claim 1, wherein the button is located above the locking tab, and when the insertion end of the supporting arm is inserted into the accommodating cavity, which is at a locked state, the button is located above the support structure.

9. The display stand of claim 1, wherein the mounting seat comprises a connecting plate at the bottom of a reserved hole of the support structure and a cylinder connected to the bottom of the connecting plate; the cylinder is internally provided with an accommodating cavity; the slot is formed on the connecting plate and communicated with the reserved hole of the support structure.

10. The display stand of claim 1, wherein a housing slidably sleeves the supporting arm, and the housing is used for shielding the button on the supporting arm.

11. A mounting method of a display according to claim 1, wherein it comprises the following steps:
1) connect the mounting seat to the support structure;
2) insert the insertion end of the supporting arm of the display stand into the accommodating cavity through the slot of the mounting seat;
3) adjust the position of the insertion end of the supporting arm within the accommodating cavity to enable the locking tab on the insertion end to be inserted into the locking hole on the inner wall of the accommodating cavity;
4) move the housing mounted on the supporting arm to slide toward the mounting seat and shielding the button (403) on the supporting arm.

12. The mounting method of a display of claim 11, wherein a locating pin is connected inside the accommodating cavity; a locating slot matching the locating pin for insertion is formed at the bottom of the insertion end of the supporting arm; when the insertion end of the supporting arm is inserted in the accommodating cavity and the locating slot at the bottom of the insertion end is inserted on the locating pin, the free end of the locking tab is inserted into the locking hole on the inner wall of the accommodating cavity.

\* \* \* \* \*